Patented Mar. 29, 1927.

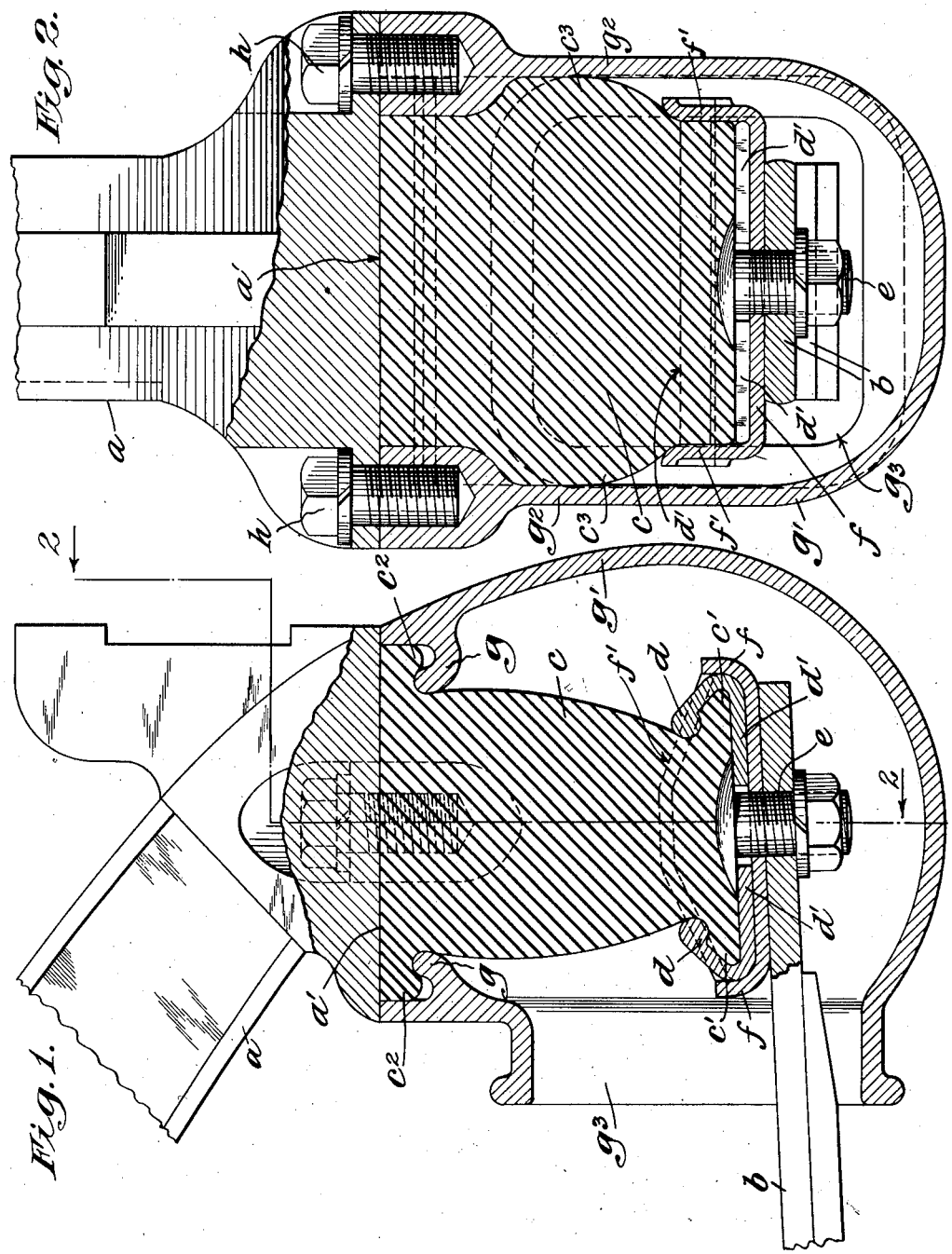

1,622,729

UNITED STATES PATENT OFFICE.

AUGUST H. LEIPERT, OF COLLEGE POINT, NEW YORK, ASSIGNOR TO INTERNATIONAL MOTOR COMPANY, OF NEW YORK. N. Y., A CORPORATION OF DELAWARE.

CUSHION CONNECTION FOR VEHICLE CONSTRUCTION.

Application filed May 17, 1926. Serial No. 109,480.

In United States Serial No. 88,562, filed February 16, 1926 by the present applicant there is disclosed a cushion connection between parts of a motor vehicle wherein spaced portions of a block of yielding non-metallic material are connected, respectively, to the said vehicle parts. The present invention relates broadly to such yielding non-metallic cushion connection and support. More specially the invention relates to a novel improved housing or shield for the cushioning connection and seeks to utilize the shield as securing means therefor in a construction which can be simply and inexpensively manufactured and conveniently installed. To this end spaced portions of a block of yielding non-metallic material are flanged and devices are provided to secure the flanged portions to the spaced parts of the vehicle. The invention is particularly applicable as a connection and support for the end of a vehicle leaf spring and in this connection the end of the leaf spring carries seats adapted to overlie and engage one of the flanged parts of the block. Another flanged portion of the block is secured to the vehicle frame by means of a housing into which the end of the spring extends which housing is provided with an inward lip adapted to clamp the flange of the block to the frame. In order that the invention may be clearly understood and readily carried into effect the same will now be described more fully with reference to the accompanying drawings illustrating a preferred embodiment thereof, in which:

Figure 1 is a view in side elevation and partly in section showing the yielding non-metallic cushioning connection according to the present invention and the manner in which it is secured to the frame and vehicle spring by means of a portion of a housing enclosing the connection and the end of the spring.

Figure 2 is a transverse vertical sectional view taken in the planes indicated by the broken line 2—2 in Figure 1 and looking in the direction of the arrows.

The frame member $a$ is supported from the vehicle leaf spring $b$ by means of a block of yielding non-metallic material $c$ which is secured to the end of the leaf spring by seat elements $d$, $d$ adapted to overlie forwardly and rearwardly disposed flanged portions $c'$ of the block. The seat members $d'$ extend transversely of the spring leaf and are secured thereto by the bolt $e$. A trough is formed by the seat members $d$, $d$ within which the lower portion of the block is compressed, the ends of the trough being closed by an irregular shaped seat $f$ formed with relatively high end walls $f'$ which serve to confine the material of the block within the trough formed by the members $d$.

At its upper portion the block is also formed with flanges $c^2$ along the forward and rear edges thereof and these flanges are adapted to be clamped against the plane lower surface $a'$ of the frame member by forwardly directed lips $g$ formed on a housing $g'$ which entirely surrounds the connection and protects it from exposure and the effects of the elements. The side walls $g^2$ of the housing are so spaced as to provide abutments for the distorted portions $c^3$ of the block, the distortion being induced obviously by the compression resulted from the weight of the vehicle resting upon the yielding non-metallic material.

In the preferred embodiment the housing is formed with an opening $g^3$ through which the spring $b$ enters. It may be secured to the frame in any convenient manner and is illustrated as secured by bolts $h$ which tend to draw the housing upwardly and serve to define the compression exerted upon the flanged portion $c^2$ of the block.

It will thus be seen that a cushion connection for a vehicle construction has been provided which may be readily assembled and includes particularly a housing therefor which serves the dual function of protecting the non-metallic cushioning material and securing the same to the frame.

Various modifications may be made in the particular manner of securing the yielding non-metallic material to the respective elements to be connected as well as in the form of the housing protecting the same and co-operating as one of the securing means for the block and no limitation is intended by the phraseology of the foregoing description except as indicated in the appended claims.

What I claim is:

1. In a cushion connection of the character described, in combination with two metallic parts, a single column of yielding non-metallic material positively connecting the parts and supporting the load of one directly on the other, means carried with the respective parts positively clamping spaced portions of the yielding non-metallic material thereto, and a housing for the connection.

2. In a cushion connection of the character described, in combination with two metallic parts, a single column of yielding non-metallic material positively connecting the parts and supporting the load of one directly on the other, means carried with the respective parts positively clamping spaced portions of the yielding non-metallic material thereto, and a housing for the connection carrying one of the clamping means.

3. In a cushion connection of the character described, the combination with the frame and leaf spring, of a block of yielding non-metallic material, means to clamp the block to the leaf spring, a housing, means carried with the housing to secure the block to the frame, the side walls of said housing serving as abutments against lateral displacement of the block, and means to secure the housing to the frame.

This specification signed this 30th day of April A. D. 1926.

AUGUST H. LEIPERT.